June 4, 1963

R. W. REACH, JR 3,092,807

CHECK NUMBER GENERATOR

Filed Nov. 24, 1958

2 Sheets-Sheet 1

INVENTOR.
ROY W. REACH, JR.
BY Henry L. Hanson
ATTORNEY

June 4, 1963 R. W. REACH, JR 3,092,807

CHECK NUMBER GENERATOR

Filed Nov. 24, 1958 2 Sheets-Sheet 2

6C3 GENERATOR STRUCTURE

United States Patent Office 3,092,807

Patented June 4, 1963

3,092,807

CHECK NUMBER GENERATOR

Roy W. Reach, Jr., Sudbury, Mass., assignor to Minneapolis-Honeywell Regulator Company, Minneapolis, Minn., a corporation of Delaware Filed Nov. 24, 1958, Ser. No. 776,125
12 Claims. (Cl. 340—146.1)

A general object of the present invention is to provide a new and improved apparatus for use in the monitoring and checking of digital information. More specically, the present invention is concerned with the new and improved apparatus for producing a checking number or monitor number for digital information, which apparatus is characterized by the increased checking power of the resultant check number produced by the apparatus, said apparatus check further being realized by electrical logical circuitry of a form readily implemented with minimum cost and complexity.

Digital informational handling apparatus such as data processors of the type used in transferring and manipulating of digital data frequently operate with data coded in the binary form of notation. In the binary form of notation, data may be represented in terms of electrical pulses, the presence or absence of which may be arranged in a predetermined positional or time sequence to uniquely identify characters and numerals. In the event that the electrical pulses become transposed in their positions, or are eliminated from a desired position, there will be a corresponding change in the meaning of the information. This will then be an error. In order that digital data processing apparatus may be useful, it is essential that there be provided means for checking or detecting the presence of errors so that steps may be taken to correct the error, either manually or automatically.

In a patent issued to R. M. Bloch, Reissue 24,447, dated March 25, 1958, there is disclosed a diagnostic information monitoring system for generating a number, sometimes referred to as a weight count, which is appended to a plurality of information bits as a checking number. In its elemental form, the checking system of the Bloch type is sometimes referred to as a parity check, or an "odd-even" check. In this scheme, the information being handled is divided into groups of bits of uniform length or number, and a satellite or checking bit is carried with the information, depending upon whether or not the number of bits of a selected type, a one or a zero, in each group is odd or even. The parity check of this type is useful in detecting many types of errors. However, there are certain types of errors which are not caught by the parity checking system, particularly where there is a transposition of a pair of bits, or where two like bits are lost without the parity checking bit providing an indication of such loss.

A more powerful type of checking circuit is also disclosed in the above mentioned Bloch patent, and this scheme involves the generating of a multiple bit checking number by an adding circuit operating in a predetermined modulus, for example, modulo 9, wherein each of the information bits are weighted in accordance with the binary form of notation in a predetermined sequence. Thus, an information group comprising four bits might well be weighted in accordance with the values 1, 2, 4, and 8, the check number therefor being the sum of the weights of the bits which are ones, reduced modulo 9. This latter scheme is capable of detecting all single errors and many different combinations of multiple errors which cannot be detected by a single "odd-even" check, or parity check.

In accordance with the teachings of the present invention, an even more powerful check than the weighted checking scheme disclosed above has been provided by a new and improved means for generating a multiple bit weight count or checking number wherein each bit of information used for generating the checking number is treated equally with all bits of like type, although not necessarily with the same numerical significance. This has been achieved by the use of a plurality of accumulator stages operating in modulo 2 without carry wherein each information bit used in generating the weighted number will be effective to complement a fixed number of the accumulator stages in a predetermined sequence. This may be achieved by way of appropriate gating signals operating on the accumulator stages or by the gating of a continuously changing counter having a fixed number of output stages with a predetermined signal state thereon.

It is accordingly a further more specific object of the present invention to provide a new and improved apparatus for generating a checking number for a plurality of information bits comprising an accumulator circuit having a fixed number of stages therein which are complemented each time a selected type of information bit is applied to the circuit.

A still further more specific object of the present invention is to provide a new and improved checking number generating circuit incorporating a plurality of accumulator stages operating modulo 2 without carry wherein a selected combination of certain accumulator stages are complemented upon the occurrence at the input of the circuit of a selected type of input bit.

The foregoing objects and features of novelty which characterize the invention as well as other objects of the invention are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Figure 1:
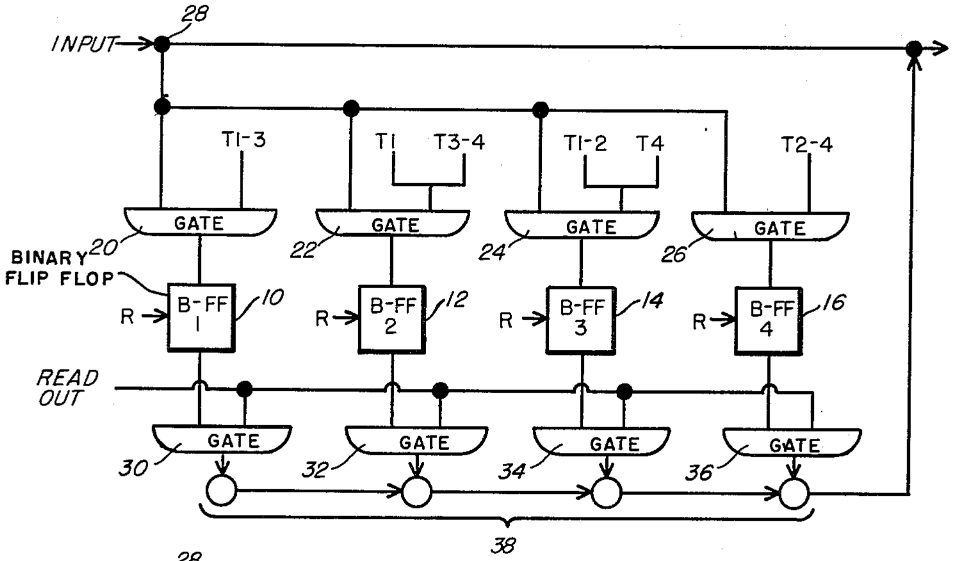
FIGURE 1 is a diagrammatic representation of one form that the present invention may assume.

Referring first to FIGURE 1, there is here illustrated one form of the invention wherein the generation of a particular weighted count, from the input information, is controlled by way of gating circuits having selected timing signals applied thereto to thereby control selected complementing of a series of accumulator stages. Considering FIGURE 1 more specifically, the numerals 10, 12, 14, and 16 identify a series of accumulator stages each of which is a bistable circuit or binary flip-flop of the type which is adapted to switch from one stable state to the opposite stable state upon the application to an input pulse thereto of a selected type of information bit. A representative form of binary flip-flop which is adapted for use in this configuration is illustrated and described in a copending application of J. J. Eachus, Serial Number 656,791, filed May 3, 1957.

Connected to the binary flip-flops on their inputs are "AND" gating circuits 20, 22, 24, and 26. One of the gate legs on each of the gates 20, 22, 24, and 26 is from an input connected to a bus 28 to which information bits are applied and transferred in serial time sequence. The other gate legs on each of the gates 20, 22, 24, and 26 are connected to a suitable timing source producing timing pulses T1, T2, T3, and T4. The outputs of the binary flip-flops are applied to a series of "AND" gating circuits 30, 32, 34, and 36, the latter gating circuits also including readout gate legs for activating the respective gates at the time that it is desired to read out the information from the binary flip-flops. The output gating circuits 30, 32, 34, and 36 are connected to a suitable shift register circuit 38, where the information may be stored and then transferred out after the information applied at the input has been transferred out by way of the bus 28.

In considering the operation of the circuit in FIGURE 1, it is first assumed that each of the binary flip-flops 10, 12, 14, and 16 are reset, by way of the reset inputs R, so that each flip-flop is in the zero state. It is further assumed that the input pulses on the bus 28 are received in time sequence with the timing pulses T1 through T4 so that the first input pulse will appear at time T1, the second input pulse will appear at time T2, the third input pulse will appear at time T3, and the fourth input pulse will appear at time T4. If the first input pulse is a one, this pulse will be applied to each of the gates 20, 22, 24, and 26. However, since the first pulse or bit will appear at time T1, the only gates that will be open will be the gates 20, 22, and 24. Consequently, the binary flip-flops 10, 12, and 14 will each be complemented so that these three flip-flops will be storing a "one" condition, and the fourth flip-flop will be storing a "zero" condition.

If the second input bit or pulse is a one, this will likewise be applied to each of the gating circuits 20, 22, 24, and 26. In this case, however, the gates 20, 24, and 26 will be opened by the timing pulse T2. With each of the gates 20, 24, and 26 open, the binary flip-flops 1, 3, and 4 will be complemented so that now the binary flip-flops will be set to 0101. If the third bit position of the input information is also a one, this will again be applied to each of the input gating circuits 20, 22, 24, and 26. In this case, the gating circuits will be operated in accordance with the timing signal T3. This will mean that the binary flip-flops 10, 12, and 16 will be complemented. This complementing will result in the flip-flops of the accumulator being set to 1000.

If the fourth input bit is also a one, at time T4, the binary flip-flops 12, 14, and 16 will be complemented in the manner above described, and the result now stored in the binary flip-flops wil be 1111.

The timing pulses T1 through T4 may once again be repeated for additional information bits if it is desired that the number being generated in the binary flip-flops be used for checking more than four input bits. For example, a typical machine word used in the data processing system may contain forty-eight information bits. As a matter of convenience, it is practical to generate a checking number for all forty-eight bits, and then append these checking bits to the end of the information, so that all of the information bits and the check bits may be transferred as an entity.

After the check number has been appropriately generated in the binary flip-flops or accumulator stages, the outputs from these stages may be read through the output gates 30, 32, 34, and 36, when an appropriate readout signal is applied thereto. The signal may then be transferred into the output register 38 and read serially out onto the bus 28, after the information bits have passed.

As will be understood by those skilled in the art, once the information bits and the check bits have been transferred to a further utilization circuit or point, a further check may be made to see if the transfer has been made without error. The information bits will once again be applied to a circuit of the type illustrated in FIGURE 1 and the resultant number generated may then be compared with the number transferred with the information to determine if the transfer has been made without error. This type of check operation is more fully discussed in the above mentioned Bloch patent.

It will be observed from the circuitry discussed in connection with FIGURE 1 that there has been provided a check number accumulator which is operating modulo 2 without carry. Further, it will be observed that for each information bit appearing at a predetermined time sequence, there will be a related complementing of selected stages of the accumulator. The resultant operation may be considered in terms of generating a check number which does not bear any direct numeric significance to the data transferred.

The form of count generation may be considered with respect to the term $nCx$, where $n$ equals the number of stages of the accumulator, and $x$ equals the number of stages that are complemented each time that a particular type of information bit, such as a one, is received at the input transfer bus. The system FIGURE 1 may then be referred to as a 4C3 check number generating system. The number of separate functions that may ge generated may be defined by the term $nCx$ where $$nCx=\frac{n!}{x!(n-x)!}$$

It will be further observed from the circuit of FIGURE 1 that each information bit, which is of the type which activates the accumulator stages, is treated in the same manner in that there are always a fixed number of complementing functions taking place relative to each bit. Thus, the $x$ in the above term preferably remains fixed in any particular check number generating circuit. It will be noted, however, that the numerical value of the resultant weight produced by this complementing scheme is not necessarily the same for each bit.

Figure 2:
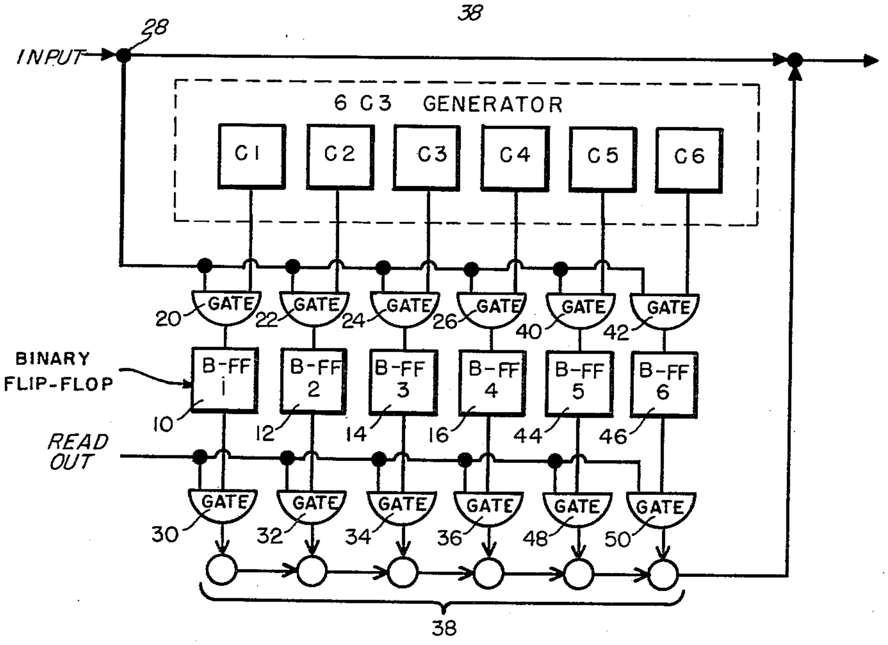
FIGURE 2 is a modified form of a circuti useful in producing a checking number in accordance with the teachings of the present invention.

Another manner of implementing the principles of the present invention is illustrated in FIGURE 2. In this figure, the timing pulses referred to in FIGURE 1 have been replaced by what may be termined an $nCx$ generating circuit, illustrated as a 6C3 generator. This generator will always have three of its stages in a set state, or in a "one" state, and the remaining three stages in the reset or "zero" state.

Considering FIGURE 2 more specifically, the circuit herein illustrated is basically the same as that of FIGURE 1 and corresponding components carry corresponding reference identification. Added to the circuitry of FIGURE 1 are the binary flip-flop stages 5 and 6 identified by the numerals 44 and 46 respectively. The input gating sections 40 and 42 are provided for the flip-flops, and the output gating sections 48 and 50 are provided for the corresponding flip-flops. In addition, a 6C3 generator is provided and includes six counter stages C1, C2, C3, C4, C5, and C6. The count generator is set up with six stages, three of which are always in the "one" state and the remaining three of which are always in the "zero" state. A representative form of output for the six stages in time sequence may be as represented in the following table:

TABLE A

| *C1 to C6* |
|---|
| 111000 |
| 011100 |
| 001110 |
| 000111 |
| 100011 |
| 110001 |
| 110100 |
| 011010 |
| 001101 |
| 100110 |
| 010011 |
| 101001 |
| 110010 |
| 011001 |
| 101100 |
| 010110 |
| 001011 |
| 100101 |
| 101010 |
| 010101 |
| 111000 |

The logic which interconnects the counter stages C1 through C6 may be represented in the manner shown in the following table:

TABLE B

*Counter Stages C1–C6*

[Count pulse=X; clear pulse=Y]

Figure 3:
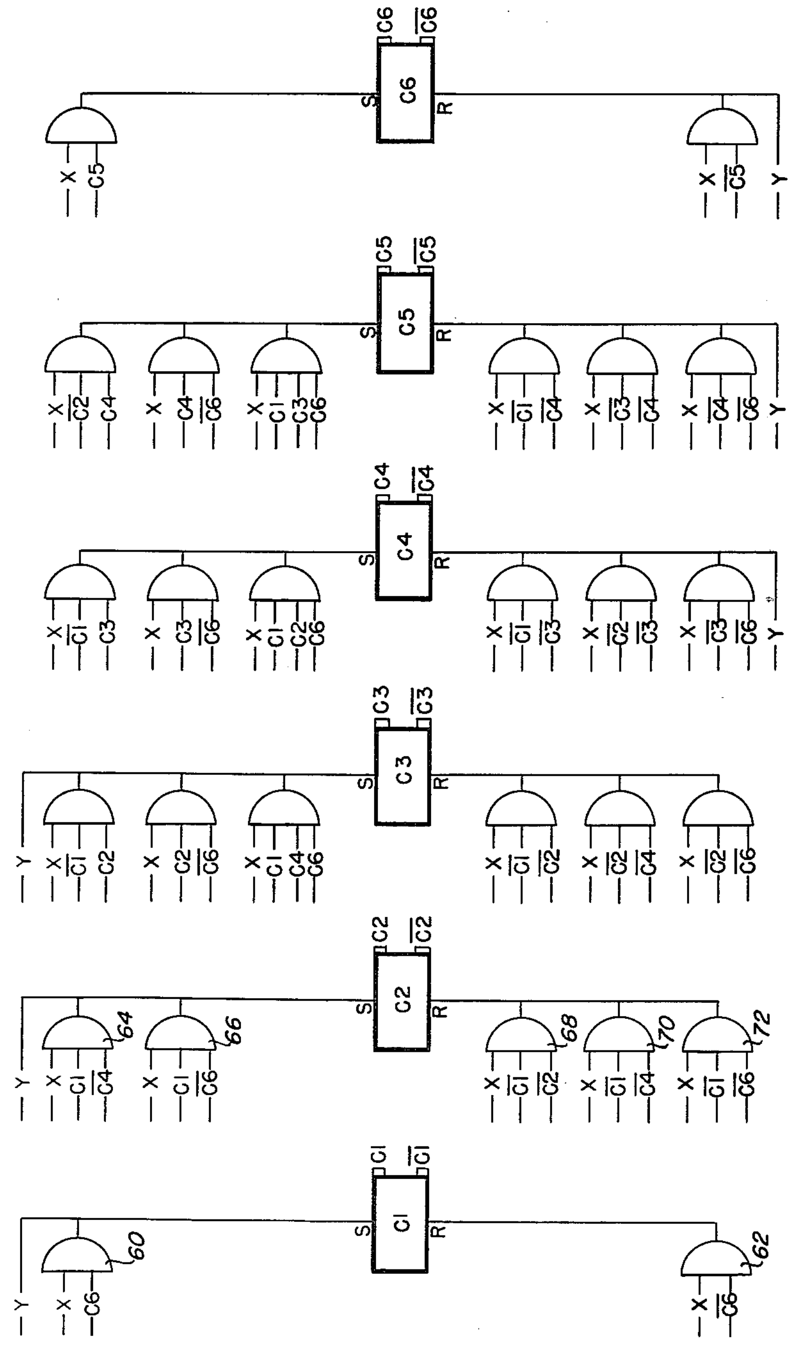
FIGURE 3 shows logical circuitry for implementing a counter which may be used in the present invention.

Set C1: $Y+X\cdot C6$
Reset C1: $X\cdot \overline{C6}$
Set C2: $Y+X\cdot C1\cdot \overline{C4}+X\cdot C1\cdot \overline{C6}$
Reset C2: $X\cdot \overline{C1}\cdot \overline{C4}+X\overline{C1}\cdot \overline{C6}+X\cdot \overline{C1}\cdot \overline{C2}$
Set C3: $Y+X\cdot C2\cdot \overline{C1}+X\cdot C1\cdot C4\cdot C6+X\cdot C2\cdot \overline{C6}$
Reset C3: $X\cdot \overline{C1}\cdot \overline{C2}+X\cdot \overline{C2}\cdot \overline{C4}+X\cdot \overline{C2}\cdot \overline{C6}$
Set C4: $X\cdot C1\cdot C2\cdot C6+X\cdot C3\cdot \overline{C1}+X\cdot C3\cdot \overline{C6}$
Reset C4: $Y+X\cdot \overline{C3}\cdot \overline{C1}+X\cdot \overline{C2}\cdot \overline{C3}+X\cdot \overline{C3}\cdot \overline{C6}$
Set C5: $X\cdot C1\cdot C3\cdot C6+X\cdot C4\cdot \overline{C2}+X\cdot C4\cdot \overline{C6}$
Reset C5: $Y+X\cdot \overline{C4}\cdot \overline{C1}+X\cdot \overline{C3}\cdot \overline{C4}+X\cdot \overline{C4}\cdot C6$
Set C6: $X\cdot C5$
Reset C6: $Y+X\cdot \overline{C5}$ The manner in which the foregoing Boolean statements may be incorporated in a complete six-stage counter is illustrated in FIGURE 3. Referring to FIGURE 3, it will be seen that the logical circuit comprises six bistable flip-flops C1–C6, each of which has a set input S and a reset input R. Further, each of these bistable circuits has an assertion output C, which is adapted to be active when the associated circuit has been set, and a negation output $\overline{C}$ when the particular bistable circuit has been reset.

The set input for the bistable circuit C1 is adapted to be activated by a clear signal Y, which represents the clear pulse for the entire counter, or by way of a signal derived from an input AND gate 60. This AND gate 60 has as an input the count signal or pulse X and a signal from the counter stage C6, the latter signal being an assertion signal which will be active when the counter stage C6 is in the set state. It will be apparent that the bistable circuit C1 will be reset when a signal is passed through a further AND gate 62, the latter of which has the count or timing pulse input X and a negation signal $\overline{C6}$ from the counter stage C6.

The input for the counter stage C2 is somewhat more complex than the counter stage C1 and will be seen to comprise, on the set input side, a circuit which includes a clear signal input Y and a signal from a pair of AND gates 64 and 66. The clear pulse input and the outputs from the AND gates 64 and 66 will be seen to be buffered together so that when there is a signal on any one of the outputs, the bistable circuit C2 will be switched to the set state. The AND gate 64 has three inputs comprising the count pulse X, an assertion output from the bistable circuit C1, and a negation output from the bistable circuit C4. The AND gate 66 will be seen to comprise three inputs which include the count pulse X, an assertion output $\overline{C1}$ from the bistable circuit C1 and a negation output $\overline{C6}$ from the bistable circuit C6.

The reset input for the bistable circuit C2 may be derived from any one of three input AND gates 68, 70 or 72. The AND gate 68 has three inputs which comprise the count pulse X, the negation output $\overline{C1}$ from the bistable circuit C1 and the negation output $\overline{C2}$ from the bistable circuit C2. The AND gate 70 has three inputs which include the count pulse X, the negation output $\overline{C1}$ of the bistable circuit C1, and the negation output $\overline{C4}$ of the bistable circuit C4. Similarly, the AND gate 72 has three inputs which comprise the count pulse X, the negation output signal $\overline{C1}$ from the bistable circuit C1 and the negation output $\overline{C6}$ from the bistable circuit C6.

An examination of the inputs for each of the further counter stages C3 through C6 will indicate that the logical input for each of these stages on the set and reset side will be in accordance with the Boolean statements listed above in Table B.

The operation of this 6C3 counter or "generator" will be such that when the initial clear pulse is applied, the bistable circuits C1 through C3 will all be switched to the set state and the bistable circuits C4 through C6 will be switched to the reset state. When the first count pulse X is applied, the circuit C1 will be switched from the set to the reset state and the circuit C4 will be switched from the reset to the set state. The next succeeding count pulse X will cause the circuit C2 to switch from the set to the reset state and the circuit C5 to switch from the reset state to the set state. It will thus be apparent that the count progression code illustrated in Table A may be realized by this logical circuitry in the manner in which it is illustrated in FIGURE 3.

It will be obvious to those skilled in the art that the manner in which this counter is illustrated does not necessarily represent the minimal amount of logical circuitry by which this type of count may be accomplished. Thus, by certain combinations of AND and OR logic minimization techniques, it is possible to reduce the total number of AND gates and OR buffer circuits that may be required in order to implement the particular count desired as set forth in Table A.

Concerning the operation of the circuitry of FIGURE 2, it is first assumed that each of the binary flip-flops 10, 12, 14, 16, 44, and 46 are reset. Further, the counter stages C1 through C6 are also reset in accordance with the above table. Thus, at the start of the operating cycle for generating a particular check number, the first three counter stages C1, C2, and C3 will be set to the "one" state while the counter stages C4, C5, and C6 will be set to the "zero" state. If the first input information bit received on the input bus 28 is a "one," the input gates to the accumulator stages will be opened so that the setting of the counter circuits may be passed to the accumulator stages. The inputs in this case will be from the counter stages C1, C2, and C3, so that the first three binary flip-flops will be complemented.

For each input information bit, the counter circuits will advance in accordance with the logic set forth in Table B to thereby produce the outputs as represented in Table A. Each time the selected input information bit is of a preselected type, such as a one, the contents of the counter will be transferred into the accumulator stages. This will continue until such time as the entire group of information bits has been transferred and it is desired to utilize the check number which has been generated.

Once the check number has been generated, it will be transferred through the output gates from the binary flip-flops to the output register 38, and may then be transferred along with the information bits used for generating the number. As with the circuits of FIGURE 1, the resulting information bits, and their check number, may be transferred and then a further check number generated by circuit corresponding to FIGURE 2 where the information bits will again be used to generate a check number, which will be compared with the check number transferred with the information.

The circuitry of FIGURE 2 may obviously be implemented in other ways such that once again an *nCx* circuit may be used for producing the signals used in complementing the accumulator stages of the circuit.

While, in accordance with the provisions of the statutes, there has been illustrated and described the best forms of the invention known, it will be apparent to those skilled in the art that changes may be made in the apparatus described without departing from the spirit of the invention as set forth in the appended claims and that in some cases, certain features of the invention may be used to advantage without a corresponding use of other features.

Having now described the invention, what is claimed as new and novel and for which it is desired to secure by Letters Patent is:

1. Apparatus for generating a checking number for a plurality of information bits to be manipulated comprising a counter circuit having a plurality of stages and each being adapted to be selectively incremented according to a predetermined pattern for each bit position of the information manipulated, an accumulator, means responsive to the presence of a selected type of information bit for simultaneously connecting a plurality of said stages of said counter to said accummulator each time said selected bit appears in said information bits, and means connected to said accumulator for transferring the contents of said accumulator with said information bits.

2. Apparatus for generating a checking number for a plurality of information bits to be manipulated comprising a counter having a predetermined number of stages adapted to have selected ones of said stages complemented for each bit position of the information to be manipulated, means responsive to the presence of a selected type of information bit for simultaneously complementing selected ones of the stages of said counter each time said selected bit appears in said information bits, and means connected to said counter for tranferring the contents of said counter with said information bits.

3. Apparatus for generating a checking number for a plurality of information bits to be manipulated comprising an *nCx* counter circuit where *n* is the number of stages in the counter and *x* is a constant representing the number of active stages at any one time, said counter being adapted to be selectively incremented according to a predetermined pattern so that a different combination of *x* stages will be active for each bit position of the information manipulated, means responsive to the presence of a selected type of information bit for complementing simultaneously selected ones of said *n* stages of said counter each time said selected bit appears in said information bits, and means connected to said counter for transferring the contents of said counter with said information bits.

4. A check number generator for a plurality of data bits comprising a plurality of bistable circuits having inputs and outputs, data input means coupled to said bistable circuits, and means including said data input means selectively complementing selected ones of said bistable circuits simultaneously upon the occurrence of each input bit of a selected type.

5. A check number generator for a plurality of data bits comprising a plurality of bistable circuits having inputs and outputs, data input means coupled to said bistable circuits, and means including said data input means selectively complementing selected ones of said bistable circuits simultaneously upon the occurrence of each input bit of a selected type.

6. A check number generator for a plurality of data bits comprising a plurality of bistable circuits having inputs and outputs, data input means coupled to said bistable circuits, and means including said data input means uniformly complementing said bistable circuits for each input bit of a selected type, said last named means comprising a signal generator circuit having a plurality of bistable stages adapted to be switched for each data bit position and having an output that for each bit position includes a variable combination of bistable states where the number of each type of bistable state remains fixed.

7. A check number generator comprising an *n* stage bistable circuit having *x* output of a first state and *n*—*x* outputs of a second state where *x* remains a fixed number, input means connected to said bistable circuit to alter the bistable states of selected ones of said *n* stages, an *n* stage accumulator, and circuit means responsive to a selected control bit for connecting the *n* stages of said bistable circuit to the corresponding *n* stages in said accumulator, said circuit means complementing simultaneously those stages in said accumulator which have an input of said first state.

8. A check number generator comprising an *n* stage bistable circuit having *x* outputs of a first state and *n*—*x* outputs of a second state where *x* remains a fixed number, input means connected to said bistable circuit to alter the bistable states of selected ones of said *n* stages, an *n* stage accumulator where each stage operates modulo 2 without carry, and circuit means responsive to a selected control bit for connecting the *n* stages of said bistable circuit to the corresponding *n* stages in said accumulator, said circuit means complementing simultaneously those stages in said accumulator which have an input of said first state.

9. A check number generator comprising multiple stage bistable control circuit having *n* stages and having *x* outputs with a signal of a first electrical state where *x* remains a fixed number, input means connected to said bistable circuit to alter the bistable states of selected ones of said stages, a multiple stage accumulator, and circuit means responsive to a selected control bit for connecting the stages of said bistable circuit to the corresponding stages in said accumulator, said circuit means complementing those stages in said accumulator which have an input of said first state.

10. A circuit for generating a weighted count for a plurality of input information bits comprising a multiple stage accumulator having an input for each stage, and means responsive to each one of a selected type of input information bit connected to the inputs of said accumulator to complement simultaneously a fixed number less than the total of the multiple stages of said accumulator.

11. A circuit for generating a weighted count for a plurality of input information bits comprising a multiple stage accumulator operating modulo 2 without carry and having an input for each stage, and means responsive to each one of a selected type of input information bit connected to the inputs of said accumulator to complement simultaneously a fixed number less than the total of the multiple stages of said accumulator.

12. A circuit for generating a weighted count for a plurality of input information bits comprising a multiple stage accumulator having an input for each stage, and means responsive to each one of a selected type of input information bit connected to the inputs of said accumulator to complement simultaneously a fixed number less than the total of the multiple stages of said accumulator, said last named means comprising an *nCx* signal generator where *n* corresponds to the number of stages of the accumulator and *x* corresponds to the number of stages to be complemented in said accumulator.

References Cited in the file of this patent

UNITED STATES PATENTS

| | | |
|---|---|---|
| 2,552,629 | Hamming | May 15, 1951 |
| 2,634,052 | Bloch | Apr. 7, 1953 |
| 2,724,104 | Wild | Nov. 15, 1955 |